US010009718B2

(12) United States Patent
Liu (10) Patent No.: US 10,009,718 B2
(45) Date of Patent: Jun. 26, 2018

(54) SIGN-IN METHOD AND DEVICE, SIGN-IN SERVER, AND STORAGE MEDIUM (71) Applicant: ZTE CORPORATION, Shenzhen, Guangdong (CN)

(72) Inventor: Zhiyuan Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days. days.

(21) Appl. No.: 15/313,887

(22) PCT Filed: Jul. 21, 2014

(86) PCT No.: PCT/CN2014/082653
§ 371 (c)(1),
(2) Date: Nov. 23, 2016

(87) PCT Pub. No.: WO2015/180250
PCT Pub. Date: Dec. 3, 2015

(65) Prior Publication Data
US 2017/0188186 A1 Jun. 29, 2017

(30) Foreign Application Priority Data

May 26, 2014 (CN) .......................... 2014 1 0225233

(51) Int. Cl.
H04W 24/00 (2009.01)
H04W 4/02 (2018.01)

(52) U.S. Cl.
CPC .................... H04W 4/02 (2013.01)

(58) Field of Classification Search
CPC ..................................... H04W 4/02
See application file for complete search history.

(56) References Cited

U.S. PATENT DOCUMENTS

2012/0208549 A1* 8/2012 Lau ........................ G01S 5/02
455/456.1
2015/0324866 A1* 11/2015 Mougenot .............. G06Q 30/02
705/14.64

FOREIGN PATENT DOCUMENTS

| CN | 103136807 | 6/2013 |
| CN | 103188763 | 7/2013 |
| CN | 103369635 | 10/2013 |
| CN | 103810767 | 5/2014 |
| CN | 103813267 | 5/2014 |

OTHER PUBLICATIONS

International Search Report for PCT/CN2014/082653 dated Mar. 4, 2015.

* cited by examiner

Primary Examiner — Wayne H Cai
(74) Attorney, Agent, or Firm — Calfee, Halter & Griswold LLP (57) ABSTRACT A sign-in method includes: determining whether a target terminal is located in a sign-in area to obtain a first determination result; when a sign-in condition is satisfied, changing a status of a user corresponding to the target terminal to a signed-in status, wherein the sign-in condition comprises at least: the first determination result indicates that the target terminal is located in the sign-in area.

8 Claims, 6 Drawing Sheets

SIGN-IN METHOD AND DEVICE, SIGN-IN SERVER, AND STORAGE MEDIUM

CROSS-REFERENCE TO RELATED APPLICATIONS

This application is the 371 application of PCT Application No. PCT/CN2014/082653 filed Jul. 21, 2014, which is based upon and claims priority to Chinese Patent Application No. 201410225233.1, filed May 26, 2014, the entire contents of which are incorporated herein by reference.

TECHNICAL FIELD

The present disclosure generally relates to the field of communication and positioning, and more particularly, to a sign-in method, a sign-in device, a sign-in server, and a computer storage medium.

BACKGROUND

Nowadays, when some websites or companies need to hold a site activity, people usually sign up for the activity online or in other ways, and when people attending the activity arrive at the activity site, they need to sign in on a piece of paper to show their presence. After the end of the activity, sign-in message will be uploaded onto the network by a staff member who organizes the activity. This increases the workload for the staff member. Moreover, there may be a situation in which the staff member makes a fake report of the number of people attending the activity for the purpose of improving the performance.

In order to prevent the fake report, a random inspection approach may be used, but this will increase human power.

In addition, considering that cell system design is adopted in a mobile communication network, a position of a user may be determined by a cell ID of a cell where a mobile phone of the user is located, and location accuracy in a hotspot area may reach about 200 meters. The cell where the mobile phone is located and an operation of the mobile phone (e.g. powering on, powering off, cell switching, user registration area (URA) updating, position updating, cell updating, cell reselection) can be detected by a signal collection system. Currently, the signal collection system can receive a command for setting a signal collection strategy, and return user data conforming the strategy and corresponding operation of the mobile phone. The services may inquire the cell ID corresponding to a current base station at which the mobile phone is registered by issuing an inquiry request to a Home Location Register (HLR). A geographical position where the mobile phone currently resides may be located by the cell ID.

This section provides background information related to the present disclosure which is not necessarily prior art.

SUMMARY

In order to solve the problems in related art, embodiments of the present disclosure provide a sign-in method, a sign-in device, a sign-in server and a computer storage medium, which can facilitate sign-in without increasing human power and, thus avoid making a false report of the number of people participating in an activity. The technical solutions of embodiments of the present disclosure are implemented as follows.

The embodiments of the present disclosure provide a sign-in method, including:

determining whether a target terminal is located in a sign-in area to obtain a first determination result;

when a sign-in condition is satisfied, changing a status of a user corresponding to the target terminal to a signed-in status, wherein the sign-in condition includes at least: the first determination result indicates that the target terminal is located in the sign-in area.

In an embodiment, the method further includes:

monitoring signals of original terminals currently located in the sign-in area;

extracting terminal identifiers of the original terminals according to the monitored signals; and determining an original terminal as the target terminal when a terminal identifier of the original terminal exists in a preset terminal identifier list.

In an embodiment, the method further includes:

determining whether a first time point, at which a signal of the target terminal is monitored, is in a preset time period to obtain a second determination result;

determining whether the status of the user corresponding to the target terminal is an unsigned-in status to obtain a third determination result;

changing the status of the user corresponding to the target terminal to a signed-in status when the sign-in condition is satisfied, wherein the sign-in condition further includes:

the second determination result indicates that the first time point is in the preset time period, and the third determination result indicates that the status of the user corresponding to the target terminal is the unsigned-in status.

In an embodiment, wherein the determining whether a target terminal is located in a sign-in area to obtain a first determination result includes:

receiving a sign-in message sent from the target terminal;

conducting a base station positioning for the target terminal sending the sign-in message to determining base station positioning information of the target terminal; and determining, according to the base station positioning information, whether the target terminal is in the sign-in area to obtaining the first determination result.

In an embodiment, the method further includes:

determining whether a second time point, at which the sign-in message is received from the target terminal, is in a preset time period to obtaining a fourth determination result;

determining whether the status of the user corresponding to the target terminal is an unsigned-in status to obtain a fifth determination result;

determining whether contents of the sign-in message sent from the target terminal are same as contents of a preset first sign-in message to obtain a sixth determination result; and changing the status of the user corresponding to the target terminal to a signed-in status when the sign-in condition is satisfied, wherein the sign-in condition further includes:

the fourth determination result indicates that the second time point is in the preset time period, the fifth determination result indicates that the status of the user corresponding to the target terminal is the unsigned-in status, and the sixth determination result indicates that the contents of the sign-in message sent from the target terminal are same as the contents of the preset first sign-in message.

In an embodiment, wherein the sign-in area is determined according to a position where the target terminal is currently located and a preset radius of the sign-in area.

In an embodiment, wherein when a sign-in condition is satisfied, the status of the user corresponding to the target terminal is changed to a signed-in status, thereafter, the method further includes:

notifying that the user corresponding to the target terminal has signed in.

The embodiments of the present disclosure further provide a sign-in device, including:

a first determination module configured to determine whether a target terminal is located in a sign-in area to obtain a first determination result;

a sign-in changing module configured to, when a sign-in condition is satisfied, change a status of a user corresponding to the target terminal to a signed-in status, wherein the sign-in condition includes at least: the first determination result indicates that the target terminal is located in the sign-in area.

In an embodiment, the first determination module includes:

a monitoring submodule configured to monitor signals of original terminals currently located in the sign-in area;

an extraction submodule configured to, according to the monitored signals, extract terminal identifiers of the original terminals; and a determination submodule configured to determine an original terminal as the target terminal when a terminal identifier of the original terminal exists in a preset terminal identifier list.

In an embodiment, the device further includes:

a second determination module configured to determine whether a first time point, at which a signal of the target terminal is monitored, is in a preset time period to obtain a second determination result;

a third determination module configured to determine whether the status of the user corresponding to the target terminal is an unsigned-in status to obtain a third determination result;

a sign-in changing module configured to change the status of the user corresponding to the target terminal to a signed-in status when the sign-in condition is satisfied, wherein the sign-in condition further includes:

the second determination result indicates that the first time point is in the preset time period, and the third determination result indicates that the status of the user corresponding to the target terminal is the unsigned-in status.

In an embodiment, the first determination module includes:

a receiving submodule configured to receive a sign-in message sent from the target terminal;

a location submodule configured to conduct a base station positioning for the target terminal sending the sign-in message to determine base station positioning information of the target terminal; and a determination submodule configured to, according to the base station positioning information, determine whether the target terminal is in the sign-in area to obtain the first determination result.

In an embodiment, the device further includes:

a fourth determination module configured to determine whether a second time point, at which the sign-in message is received from the target terminal, is in a preset time period to obtain a fourth determination result;

a fifth determination module configured to determine whether the status of the user corresponding to the target terminal is an unsigned-in status to obtain a fifth determination result;

a sixth determination module configured to determine whether contents of the sign-in message sent from the target terminal are same as contents of a preset first sign-in message to obtain a sixth determination result; and a sign-in changing module configured to change the status of the user corresponding to the target terminal to a signed-in status when the sign-in condition is satisfied, wherein the sign-in condition further includes:

the fourth determination result indicates that the second time point is in the preset time period, the fifth determination result indicates that the status of the user corresponding to the target terminal is the unsigned-in status, and the sixth determination result indicates that the contents of the sign-in message sent from the target terminal are same as the contents of the preset first sign-in message.

In an embodiment, wherein the sign-in area is determined according to a position where the target terminal is currently located and a preset radius of the sign-in area.

In an embodiment, the device further includes:

a notification module configured to notify that the user corresponding to the target terminal has signed in.

The embodiments of the present disclosure further provide a sign-in server including any one of the above described sign-in devices.

The embodiments of the present disclosure further provide a sign-in device, including: a processor; and a memory configured to store instructions executable by the processor; wherein the processor is configured to perform: determining whether a target terminal is located in a sign-in area to obtain a first determination result; when a sign-in condition is satisfied, changing a status of a user corresponding to the target terminal to a signed-in status, wherein the sign-in condition includes at least: the first determination result indicates that the target terminal is located in the sign-in area.

The embodiments of the present disclosure further provide a computer storage medium, stored therein with computer executable instructions for performing the foregoing method.

The embodiments of the present disclosure have at least one of the following beneficial effects.

The embodiments of the present disclosure provide a sign-in method, a sign-in device, a sign-in server and a computer storage medium. The method includes: determining whether a target terminal is located in a sign-in area to obtain a first determination result; when a sign-in condition is satisfied, changing a status of a user corresponding to the target terminal to a signed-in status, wherein the sign-in condition includes at least a condition that the first determination result indicates that the target terminal is located in the sign-in area. With the technical solutions of the embodiments of the present disclosure, when a terminal enters a preset sign-in area, a user corresponding to the terminal may sign in via the terminal, such that the user is enabled to sign-in without increasing human power, and thus avoiding making a false report of the number of people participating in an activity.

The embodiments of the present disclosure further provide a non-transitory computer-readable storage medium having stored therein instructions that, when executed by a processor of a terminal device, causes the terminal device to perform a sign-in method, the method including: determining whether a target terminal is located in a sign-in area to obtain a first determination result; when a sign-in condition is satisfied, changing a status of a user corresponding to the target terminal to a signed-in status, wherein the sign-in condition includes at least: the first determination result indicates that the target terminal is located in the sign-in area.

Preferably, in the embodiments of the present disclosure, a target terminal may be determined by monitoring signals of all original terminals in the sign-in area, and automatic sign-in can be enabled. Alternatively, the target terminal entering the sign-in area may sign in by initiatively sending a sign-in message, which realizes the automatic sign-in of via the terminal, thus avoiding the increase of the human power.

This section provides a summary of various implementations or examples of the technology described in the disclosure, and is not a comprehensive disclosure of the full scope or all features of the disclosed technology.

DETAILED DESCRIPTION

In order to make the technical problems to be solved, the technical solutions and advantages in the embodiments of the present disclosure more apparent, hereinafter, specific embodiments will be described in detail with reference to the accompanying drawings.

Figure 1:
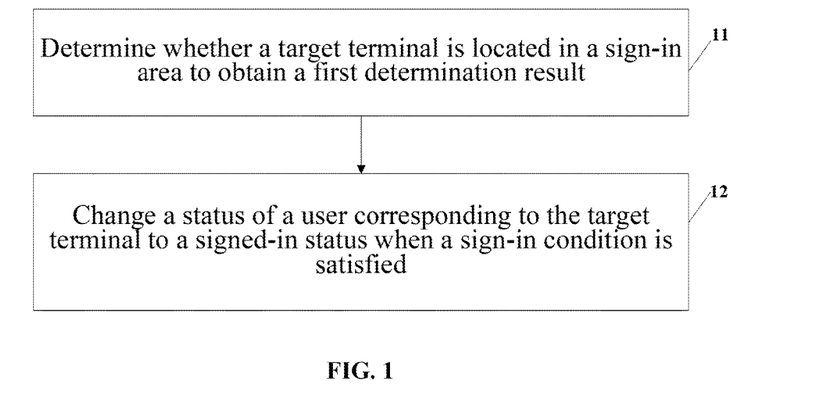
FIG. 1 is a flow chart illustrating a sign-in method according to an embodiment of the present disclosure.

The embodiments of the present disclosure provide a sign-in method. As shown in FIG. 1, the method includes the following steps.

In step 11, it is determined whether a target terminal is located in a sign-in area, and a first determination result is obtained.

In step 12, when a sign-in condition is satisfied, a status of a user corresponding to the target terminal is changed to a signed-in status.

Wherein the sign-in condition includes at least a condition that the first determination result indicates that the target terminal is located in the sign-in area.

In the embodiments of the present disclosure, when the sign-in condition is satisfied, it indicates that the terminal is located in the sign-in area, at this time, the user corresponding to the terminal can sign-in through the terminal, such that the objective of the present disclosure will be realized.

When the step 11 of determining whether a target terminal is located in a sign-in area is performed, preferably, the following two approaches may be adopted.

Approach One

The step 11 specifically includes:

monitoring signals of all original terminals currently located in the sign-in area;

according to the monitored signals, extracting terminal identifiers of the original terminals; and when the terminal identifier of the original terminal exists in a preset terminal identifier list, determining that the original terminal is the target terminal, and the first determination result is that the target terminal is located in the sign-in area.

Since a cell where a terminal is located and an operation of the terminal can be detected through a signal collection system, after a website or a company holding an activity determines a specific sign-in area on the map, a geographic position range in which the sign-in area is located is converted into cell IDs corresponding to various base station cells. At this time, signals of all original terminals in the sign-in area can be monitored based on the cell IDs corresponding to the sign-in area, and terminal identifiers of the original terminals can be extracted therefrom. Preferably, the terminal identifier herein may be a terminal number.

In an embodiment, considering that not all of the users corresponding to all the original terminals entering the sign-in area come here for the activity, a target terminal which is required to sign in needs to be screened from the original terminals in the sign-in area. Preferably, the target terminal may be determined according to a preset terminal identifier list. Since the target terminal is screened from the original terminals in the sign-in area, the determined target terminal is necessarily located in the sign-in area.

In order to enable sign-in, in addition to the need for determining whether the target terminal is located in the sign-in area, preferably, it is also required to consider whether the target terminal enters the sign-area within the time period designated in the activity, so as to avoid repetitive sign-in. Therefore, the sign-in method further includes:

determining whether a first time point, at which the signal of the target terminal is monitored, is in a preset time period, and obtaining a second determination result;

determining whether a status of a user corresponding to the target terminal is an unsigned-in status, and obtaining a third determination result;

correspondingly, the sign-in condition includes:

the second determination result indicating that the first time point is in the preset time period, and the third determination result indicating that the status of the user corresponding to the target terminal is the unsigned-in status.

When the above-described approach is used to carry out sign-in, if the target terminal enters the sign-in area in the preset time period, and the user corresponding to the target terminal has not yet signed in, sign-in processes can be automatically accomplished. Certainly, in addition to the above-described manner, the target terminal may accomplish the sign-in by initiatively sending sign-in message. The specific processes are as follows.

Approach Two

The step 11 specifically includes:

receiving sign-in message sent from the target terminal;

conducting a base station location of the target terminal which sends the sign-in message, and determining base station location information of the target terminal; and according to the base station location information, determining whether the target terminal is in the sign-in area, and obtaining the first determination result.

When this approach is adopted, as long as a terminal sends sign-in message, the terminal is determined as the target terminal and, thus, is located. If the result of the locating indicates that the target terminal is located in the sign-in area, it is determined that the first determination result is that the target terminal is located in the sign-in area.

Certainly, when the second approach is employed, in addition to the determination of whether the target terminal is located in the sign-in area, preferably, the method further includes:

determining whether a second time point, at which the sign-in message is received from the target terminal, is in a preset time period, and obtaining a fourth determination result;

determining whether a status of a user corresponding to the target terminal is an unsigned-in status, and obtaining a fifth determination result;

determining whether contents of the sign-in message sent from the target terminal are same as contents of preset first sign-in message, and obtaining a sixth determination result;

correspondingly, the sign-in condition includes:

the fourth determination result indicating that the second time point is in the preset time period, the fifth determination result indicating that the status of the user corresponding to the target terminal is the unsigned-in status, and the sixth determination result indicating that the contents of the sign-in message sent from the target terminal are same as the contents of the preset first sign-in message.

When the above-described approach is used to sign in, if the sign-in formation sent from the target terminal is received, it is required to determine whether the target terminal is located in the sign-in area based on base station location, and it is also required to determine whether the target terminal enters the sign-in area in the time period designated in the activity, whether the contents of the sign-in formation are same as the contents of the preset first sign-in message and whether the user corresponding to the target terminal has signed in, if no, the sign-in processes can be accomplished at this time.

Any of the above-described two approaches may be used, that is, the website or company holding the activity may determine identifiers of terminals of people participating in this activity in advance, when a target terminal enters the sign-in area within designated time for the first time, sign-in can be automatically accomplished. Alternatively, the terminals of all the people participating in the activity are required to be in the sign-in area and to send sign-in message containing specified contents within the designated time, then the sign-in can be accomplished. Certainly, the website or company holding the activity may determine the identifiers of the terminals of the people participating in this activity in advance, other users who do not sign up for this activity can sign in at the activity site by sending the sign-in message.

In addition, in the embodiments of the present disclosure, the determination of the sign-in area may be implemented using the following two approaches.

Approach One

The web site or company holding the activity may determine, on the map, a geographic area range as the sign-in area in advance, in which the activity is held.

The geographical position range in which the sign-in area is located may be converted into cell IDs corresponding to various cells, so as to monitor all the original terminals in the area, and thus the target terminal is screened therefrom. Alternatively, after sign-in message sent from the target terminal is received, a base station location is conducted of the target terminal, so as to determine whether the target terminal is located in the sign-in area.

In addition to the above-described approach for the determination of the sign-in area, the embodiments of the present disclosure provide another preferable and more flexible approach for determining the sign-in area.

Approach Two

The sign-in area is determined according to a position where a first terminal is currently located and a preset radius of the sign-in area.

After arriving at the activity site, a person responsible for the activity may send an activity start message through the first terminal, at this time, a position where the first terminal is currently located may be determined based on base station location. The actual sign-in area may be determined with this position as the center, based on a preset sign-in area radius.

Meanwhile, a third time point at which the first terminal sends the activity start message may be a time point at which the activity is started. At the end of the activity, the responsible person sends an activity end message through the first terminal, and a fourth time point corresponding thereto is a time point at which the activity ends. A time period from the third time point to the fourth time point is referred to as a sign-in time period.

Certainly, in the embodiments of the present disclosure, when a sign-in condition is satisfied, a status of a user corresponding to the target terminal is changed to a signed-in status, thereafter, the method further includes:

notifying that the user corresponding to the target terminal has already signed in.

The notification that the user corresponding to the target terminal has already signed in may be implemented by sending a successful sign-in message to the target terminal. The specific contents of the successful sign-in message may be set in advance.

In addition, according to the needs, while the user is notified that he/she has already signed in, specific information including name, terminal identifier or the like on the user who has signed in may be sent to the responsible person in form of message.

After the sign-in of the activity ends, a user from the web site or company may check information on the users who have successfully signed in by logging in to the company portal, avoiding making a false report of the number of people attending the activity, and meanwhile, no human power is increased.

The whole processes of the sign-in method provided by the embodiments of the present disclosure will be described hereinafter with reference to the above-described processes.

Figure 2:
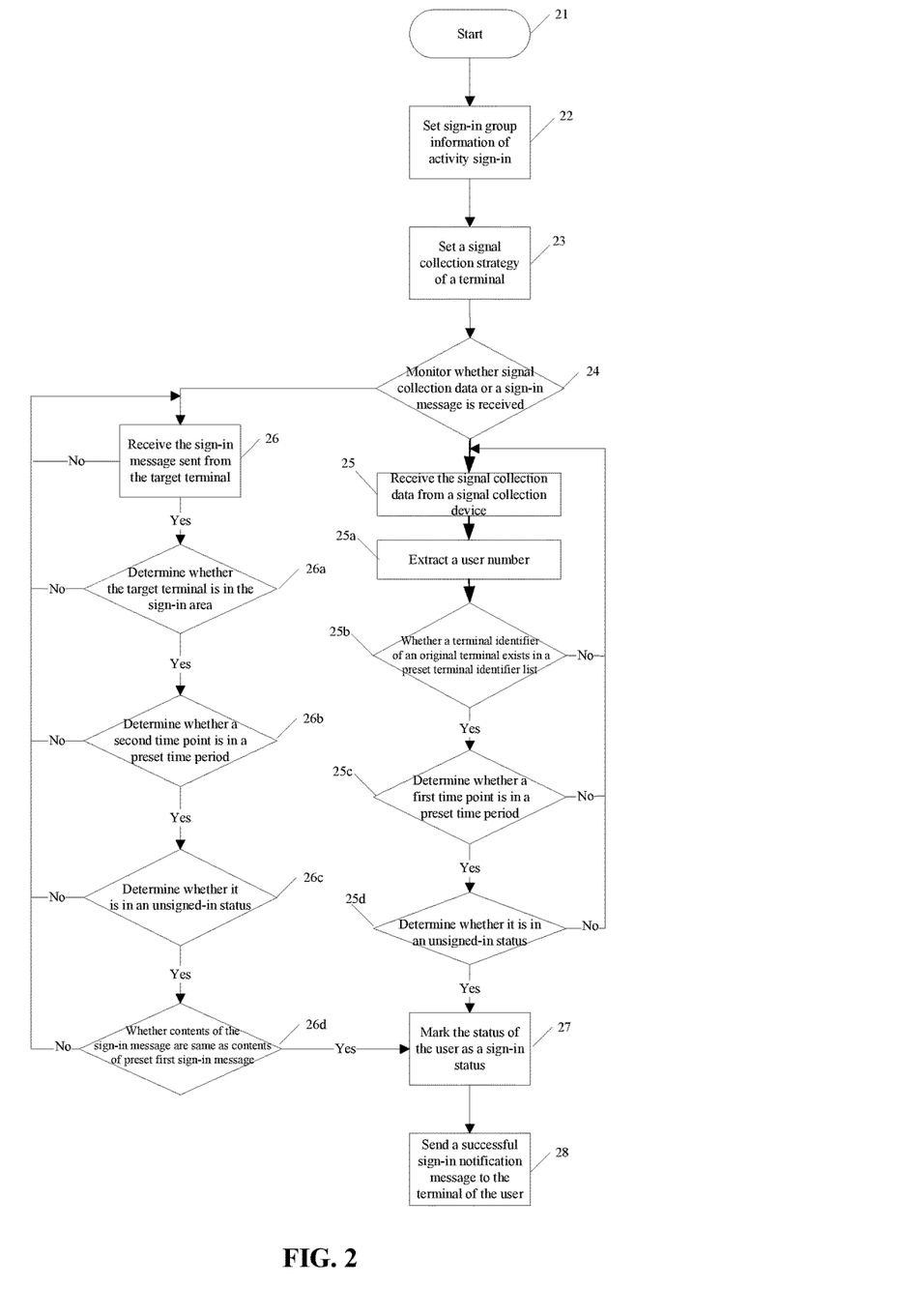
FIG. 2 is a flow chart illustrating a first overall process of a sign-in method according to an embodiment of the present disclosure.

As shown in FIG. 2, the sign-in method includes:

In step 21, an operator deploys services for a website or company which is going to hold an activity.

In step 22, when sign-in needs to be started, the responsible person establishes a group for this activity via the company portal, and sets information on the group in advance. The information on the group includes determining a range of a location for holding the activity on the map (i.e., determining a sign-in area), inputting an activity start time point and an activity end time point, inputting information (name, terminal number, and the like) on the person responsible for this activity, inputting information (names, terminal numbers and so on) on people who sign up for this activity, setting contents of a successful sign-in message to be sent, setting a feature code for an initiative sign-in message (i.e., contents of preset first sign-in message), and setting whether or not to notify the responsible person by message upon electronic sign-in by a user attending the activity.

In step 23, a signal collection strategy is set, wherein the signal collection strategy is to monitor signals of all original terminals in the sign-in area.

In step 24, a system monitors whether signal collection data or a sign-in message is received or not, if the signal collection data is received from a signal collection device, step 25 is performed, and if the sign-in message is received from a message platform, step 26 is performed.

In step 25, the signal collection data is received from the signal collection device, and it proceeds to step 25a.

In step 25a, a user number is extracted from the signal collection data, and it proceeds to 25b.

In step 25b, it is determined whether the terminal corresponding to the number exists in a preset terminal identifier list, if yes, it proceeds to step 25c, and if no, it returns to the step 25.

In step 25c, it is determined whether a first time point, at which the signal is monitored, is between activity start time and activity end time, if yes, it proceeds to step 25d, and if no, it returns to the step 25.

In step 25d, it is determined whether a status of the user corresponding to the terminal is an unsigned-in status, if yes, it proceeds to step 27, and if no, it returns to the step 25.

In step 26, the sign-in message is received from the message platform.

In step 26a, a current position of the terminal sending the sign-in message is inquired on a core network, and then it is determined whether the current position is in the preset sign-in area, if yes, it proceeds to step 26b, and if no, it returns to the step 26.

In step 26b, it is determined whether a current second time point, at which the sign-in message is received, is between the activity start time and the activity end time, if yes, it proceeds to step 26c, and if no, it returns to the step 26.

In step 26c, it is determined whether the status of the user corresponding to the terminal is the unsigned-in status, if yes, it proceeds to step 26d, and if no, it returns to the step 26.

In step 26d, it is determined whether contents of the received sign-in message are same as contents of preset first sign-in message, if yes, it proceeds to step 27, and if no, it returns to the step 26.

In step 27, the status of the user corresponding to the target terminal is marked as already signed in among the sign-in group.

In step 28, a successful sign-in notification message is sent to the target terminal.

Certainly, if the preset information on the group of this activity indicates that the responsible person needs to be informed, it proceeds to the step of sending a message to notify the responsible person of information on the user who has signed in.

Figure 3:
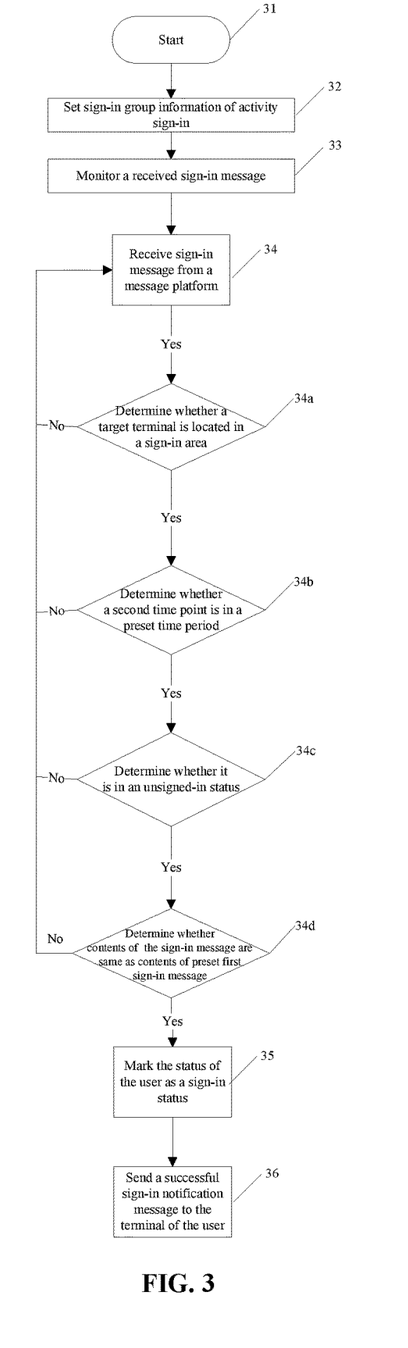
FIG. 3 is a flow chart illustrating a second overall process of a sign-in method according to an embodiment of the present disclosure.

Two sign-in approaches are employed at the same time in the above-described processes, certainly, only one of them may be used in the embodiments of the present disclosure. Taking the target terminal initiatively sending the sign-in message as an example, as shown in FIG. 3, the sign-in method includes:

In step 31, an operator deploys services for a website or company which is going to hold an activity.

In step 32, when sign-in needs to be started, the responsible person establishes a group for this activity via the company portal, and sets information on the group in advance. The information on the group includes determining a range of a location for holding the activity on the map (i.e., determining a sign-in area), inputting an activity start time point and an activity end time point, inputting information (name, terminal number, and the like) on the person responsible for this activity, inputting information (names, terminal numbers and so on) on people who sign up for this activity, setting contents of a successful sign-in message to be sent, setting a feature code for an initiative sign-in message (i.e., contents of preset first sign-in message), and setting whether or not to notify the responsible person by message upon electronic sign-in by a user attending the activity.

In step 33, the system monitors whether the sign-in message is received or not, if yes, step 34 is performed.

In step 34, the sign-in message is received from the message platform.

In step 34a, a current position of the terminal sending the sign-in message is inquired on a core network, and then it is determined whether the current position is in the preset sign-in area, if yes, it proceeds to step 34b, and if no, it returns to the step 34.

In step 34b, it is determined whether a current second time point, at which the sign-in message is received, is between activity start time and activity end time, if yes, it proceeds to step 34c, and if no, it returns to the step 34.

In step 34c, it is determined whether a status of the user corresponding to the terminal is an unsigned-in status, if yes, it proceeds to step 34d, and if no, it returns to the step 34.

In step 34d, it is determined whether contents of the received sign-in message are same as contents of preset first sign-in message, if yes, it proceeds to step 35, and if no, it returns to the step 34.

In step 35, if the user has signed up for this activity, the status of the user is marked as having signed in, and if the user has not signed up for this activity, the user is added to the list and then is marked as having signed in.

In step 36, a successful sign-in notification message is sent to the target terminal.

Certainly, if the preset information on the group of this activity indicates that the responsible person needs to be informed, it proceeds to the step of sending a message to notify the responsible person of information on the user who has signed in.

Figure 4:
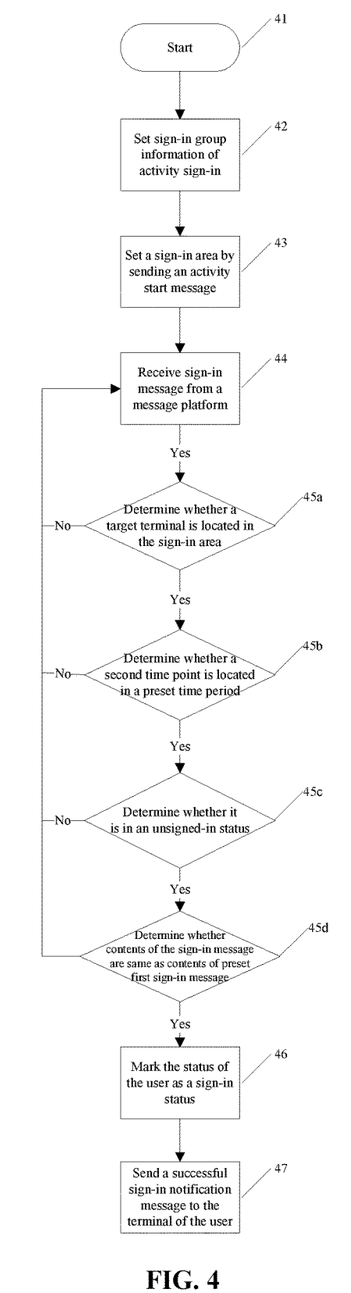
FIG. 4 is a flow chart illustrating a third overall process of a sign-in method according to an embodiment of the present disclosure.

If it is required to more flexibly determine the sign-in area, further, the responsible person may send an activity start message at the activity site, which carries therein with the sign-in area. Preferably, the responsible person may send an activity end message at the end of the activity. The whole processes are as shown in FIG. 4.

In step 41, an operator deploys services for a website or company which is going to hold an activity.

In step 42, when sign-in needs to be started, the responsible person establishes a group for this activity via the company portal, and sets information on the group in advance. The information on the group includes determining a range of a location for holding the activity on the map (i.e., determining a sign-in area), inputting an activity start time point and an activity end time point, inputting information (name, terminal number, and the like) on the person responsible for this activity, inputting information (names, terminal numbers and so on) on people who sign up for this activity, setting contents of a successful sign-in message to be sent, setting a feature code for an initiative sign-in message (i.e., contents of preset first sign-in message), and setting whether or not to notify the responsible person by message upon electronic sign-in by a user attending the activity.

In step 43, the activity start message is sent to notify the sign-in area where the terminal is located, the system monitors whether the sign-in message sent from the terminal is received or not, if yes, it proceeds to step 44.

In step 44, the sign-in message is received from the message platform.

In step 44a, a current position of the terminal sending the sign-in message is inquired on a core network, and then it is determined whether the current position is in the preset sign-in area, if yes, it proceeds to step 44b, and if no, it returns to the step 44.

In step 44b, it is determined whether a current second time point, at which the sign-in message is received, is between activity start time and activity end time, if yes, it proceeds to step 44c, and if no, it returns to the step 44.

In step 44c, it is determined whether a status of the user corresponding to the terminal is an unsigned-in status, if yes, it proceeds to step 44d, and if no, it returns to the step 44.

In step 44d, it is determined whether contents of the received sign-in message are same as contents of preset first sign-in message, if yes, it proceeds to step 45, and if no, it returns to the step 44.

In step 45, if the user has signed up for this activity, the status of the user is marked as having signed in, and if the user has not signed up for this activity, the user is added to the list and then is marked as having signed in.

In step 46, a successful sign-in notification message is sent to the target terminal.

The embodiments of the present disclosure further provide a computer storage medium, stored therein with computer executable instructions for performing the foregoing sign-in method.

Figure 5:
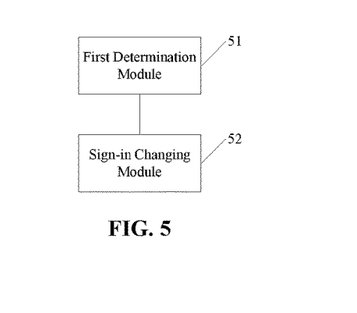
FIG. 5 is a block diagram illustrating a sign-in device according to an embodiment of the present disclosure.

The embodiments of the present disclosure provide a sign-in device. As shown in FIG. 5, the device includes a first determination module 51 and a sign-in changing module 52.

The first determination module 51 is configured to determine whether a target terminal is located in a sign-in area, and obtain a first determination result.

The sign-in changing module 52 is configured to, when a sign-in condition is satisfied, change a status of a user corresponding to the target terminal to a signed-in status.

The sign-in condition includes at least a condition that the first determination result indicates that the target terminal is located in the sign-in area.

In an embodiment, the first determination module specifically includes a monitoring submodule, an extraction submodule and a determination submodule.

The monitoring submodule is configured to monitor signals of all original terminals currently located in the sign-in area.

The extraction submodule is configured to, according to the monitored signals, extract terminal identifiers of the original terminals.

The determination submodule is configured to, when the terminal identifier of the original terminal exists in a preset terminal identifier list, determine that the original terminal is the target terminal, and the first determination result is that the target terminal is located in the sign-in area.

In an embodiment, the device further includes a second determination module and a third determination module.

The second determination module is configured to determine whether a first time point, at which the signal of the target terminal is monitored, is in a preset time period, and obtain a second determination result.

The third determination module is configured to determine whether a status of a user corresponding to the target terminal is an unsigned-in status, and obtain a third determination result.

The sign-in condition includes:

the second determination result indicating that the first time point is in the preset time period, and the third determination result indicating that the status of the user corresponding to the target terminal is the unsigned-in status.

In an embodiment, the first determination module specifically includes a receiving submodule, a location submodule and a determination submodule.

The receiving submodule is configured to receive sign-in message sent from the target terminal.

The location submodule is configured to conduct a base station location of the target terminal which sends the sign-in message, and determine base station location information of the target terminal.

The determination submodule is configured to, according to the base station location information, determine whether the target terminal is in the sign-in area, and obtain the first determination result.

In an embodiment, the device further includes a fourth determination module, a fifth determination module and a sixth determination module.

The fourth determination module is configured to determine whether a second time point, at which a sign-in message is received from the target terminal, is in a preset time period, and obtain a fourth determination result.

The fifth determination module is configured to determine whether a status of a user corresponding to the target terminal is an unsigned-in status, and obtain a fifth determination result.

The sixth determination module is configured to determine whether contents of the sign-in message sent from the target terminal are same as contents of preset first sign-in message, and obtain a sixth determination result.

The sign-in condition includes:

the fourth determination result indicating that the second time point is in the preset time period, the fifth determination result indicating that the status of the user corresponding to the target terminal is the unsigned-in status, and the sixth determination result indicating that the contents of the sign-in message sent from the target terminal are same as the contents of the preset first sign-in message.

In an embodiment, the sign-in area is determined according to a position where the terminal is currently located and a preset radius of the sign-in area.

In an embodiment, the device further includes:

a notification module configured to notify that the user corresponding to the target terminal has already signed in.

In practical application, the first determination module 51 and the sign-in changing module 52 may be implemented by a central processing unit (CPU), a digital signal processor (DSP), a micro processor unit (MPU) or a field-programmable gate array (FPGA). The CPU, DSP, MPU and FPGA may be provided in a server.

Figure 6:
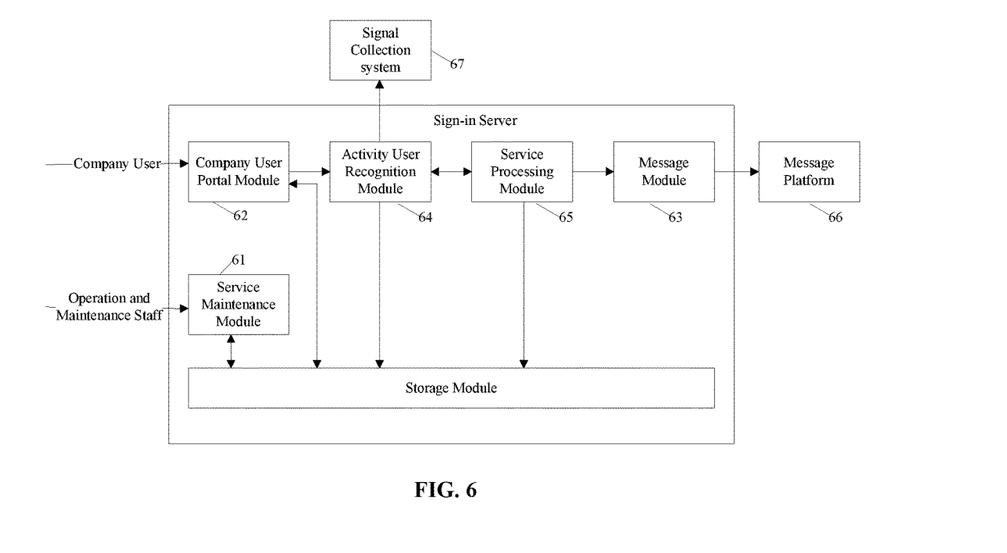
FIG. 6 is a block diagram illustrating a preferable sign-in device according to an embodiment of the present disclosure.

The embodiments of the present disclosure further provide a functional entity of a sign-in device. As shown in FIG. 6, the functional entity includes a service maintenance module 61, a company user portal module 62, a message module 63, an activity user recognition module 64, and a service processing module 65.

The service maintenance module 61 is configured to deploy services for a company user by an operator, configure a service access number, and assign a sub-access number for the company user, wherein a message destination number of electronic sign-in by the user is the service access number+ the sub-access number.

The company user portal module 62 is configured to establish a group for the company user logging in to a system, and set a range of a geographical location for holding an activity, input activity start time and activity end time, input information (name, terminal number, and the like) on the person responsible for this activity, input information (names, phones numbers and so on) on people who sign up for this activity, set contents of a successful sign-in message to be sent, set a feature code for an initiative sign-in message, and set whether or not to notify the responsible person by message upon electronic sign-in by a user attending the activity. The company user portal module 62 is further configured to convert the range of the geographical location set by the user on the map into cell IDs corresponding to various cells.

The message module 63 is configured to be connected to a message platform 66, receive and send a message, send a message received from the message platform 66, an extraction source number, a destination number, contents of the message to the service processing module 65, extract a calling number, a called number and contents of the message from a successful electronic sign-in notification message received from the service processing module 65, to create a message to be sent to the message platform 66.

The activity user recognition module 64 is configured to send a signal collection strategy to a signal collection system 67 connected thereto, and receive user information conforming the signal collection strategy from the signal collection system 67, record information on a current user in the range of the geographical location of this activity, notify the service processing module 65 when the signal collection system 67 determines that there is a user coming into the location range of this activity and return an inquire result when an request for inquiring whether the user is located in the location range of this activity is received from the service processing module 65.

The service processing module 65 is configured to receive a message for notifying that the user comes into the location range of this activity from the activity user recognition module 64, determine whether an electronic sign-in notification message has been sent to the user, abandon the message if the message has been sent, determine whether time is valid if the message has not been sent, send the electronic sign-in notification message to the message module 63 if the time is valid. The message module 63 sends the successful electronic sign-in notification message to the user. The contents of the message are contents of a notification message sent upon successful sign-in, which are set by the company user portal module 62.

The service processing module 65 is configured to receive an initiative sign-in message from the message module 63, extract a destination number of the message and a feature code in contents of the message to locate a corresponding group, send a message to the activity user recognition module 64 for inquiring whether a calling user of the message is in the location range set by the company user portal module 62, determine, upon receiving an inquire result returned by the activity user recognition module 64, whether the calling user is in the location range, send a successful electronic sign-in notification message to the message module 63 if the calling user is in the location range, and inform the message module 63 to send the successful sign-in notification message to the user who sends the initiative sign-in message.

The above-described sign-in device determines a target terminal by monitoring signals of all original terminals in the sign-in area, and enables automatic sign-in. Certainly, users who do not sign up for the activity may sign in by initiatively sending sign-in message.

Figure 7:
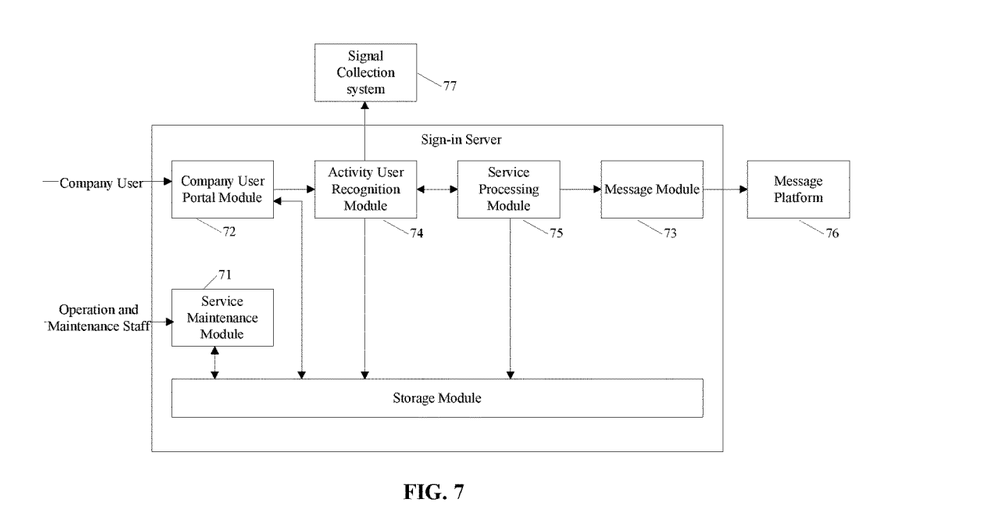
FIG. 7 is a block diagram illustrating a preferable sign-in device according to another embodiment of the present disclosure.

When the sign-in device signs in upon initiatively receiving a message sent from the target terminal, as shown in FIG. 7, the different from FIG. 6 resides in that the process for determining the location of the target terminal is different, in FIG. 7, the core network performs base station location of the target terminal which sends the sign-in message.

The embodiments of the present disclosure further provide a sign-in server including any of the above-described sign-in devices.

Those skilled in the art should realize that the embodiments of the present disclosure may be provided as a method, a system or a computer program product. Therefore, the present disclosure may use forms of a hardware embodiment, a software embodiment, or an embodiment in combination of software and hardware aspects. Furthermore, the present disclosure may use forms of computer program products implemented on one or more computer storage media (including but not limited to a magnetic disk memory, an optical memory or the like) which includes a computer program code.

The present disclosure is described with reference to flowcharts and/or block diagrams according to the method, equipment (system) and a computer program product of the embodiments of the present disclosure. It is to be understood that each flow and/or block in the flowchart and/or block diagram as well as combination of flow and/or block in the flowchart and/or block diagram may be realized by computer program instructions. These computer program instructions may be provided to a general purpose computer, a special purpose computer, an embedded processor or processors of other programmable data process equipment so as to generate a machine so that such a device configured to achieve functions designated in one or more flows of the flowchart and/or in one or more blocks of the block diagram is generated by means of instructions executed by computers or processors of other programmable data process equipment.

These computer program instructions may be stored in a computer-readable memory which can instruct a computer or other programmable data process equipment to work in a particular way so that instructions stored in the computer-readable memory may generate a manufactured product comprising a command device which can achieve functions designated in one or more flows of the flowchart and/or in one or more blocks of the block diagram.

These computer program instructions may also be loaded onto computers or other programmable data process equipment so that a series of operation steps are executed on the computers or other programmable equipment to generate a process achieved by computers, thus providing steps for achieving functions designated in one or more flows of the flowchart and/or in one or more blocks of the block diagram by means of instructions executed by computers or other programmable equipment.

The abovementioned embodiments are merely preferred embodiments of the present disclosure, and are not intended to limit the scope of protection of the present disclosure.

INDUSTRIAL APPLICABILITY

The embodiments of the present disclosure provide a sign-in method, a sign-in device, a sign-in server, and a computer storage medium. The method includes: determining whether a target terminal is located in a sign-in area, and obtaining a first determination result; when a sign-in condition is satisfied, changing a status of a user corresponding to the target terminal to a signed-in status, wherein the sign-in condition includes at least a condition that the first determination result indicates that the target terminal is located in the sign-in area. With the technical solutions of the embodiments of the present disclosure, when a terminal enters a preset sign-in area, a user corresponding to the terminal may sign in via the terminal, such that the user is enabled to sign-in without increasing human power, and thus avoiding making a false report of the number of people taking part in an activity.

What is claimed is:

1. A sign-in method, comprising:
   determining whether a target terminal is located in a sign-in area to obtain a first determination result;
   when a sign-in condition is satisfied, changing a status of a user corresponding to the target terminal to a signed-in status,
   wherein the sign-in condition comprises at least: the first determination result indicates that the target terminal is located in the sign-in area,
   wherein the method further comprises:
   monitoring signals of original terminals currently located in the sign-in area;
   extracting terminal identifiers of the original terminals according to the monitored signals; and
   determining an original terminal as the target terminal when a terminal identifier of the original terminal exists in a preset terminal identifier list, and
   wherein the method further comprises:
   determining whether a first time point, at which a signal of the target terminal is monitored, is in a preset time period to obtain a second determination result;
   determining whether the status of the user corresponding to the target terminal is an unsigned-in status to obtain a third determination result; and
   changing the status of the user corresponding to the target terminal to a signed-in status when the sign-in condition is satisfied,
   wherein the sign-in condition further comprises:
   the second determination result indicates that the first time point is in the preset time period, and
   the third determination result indicates that the status of the user corresponding to the target terminal is the unsigned-in status.

2. The method according to claim 1, wherein the sign-in area is determined according to a position where the target terminal is currently located and a preset radius of the sign-in area.

3. The method according to claim 1, wherein after changing the status of the user corresponding to the target terminal to a signed-in status when the sign-in condition is satisfied, the method further comprises:
   notifying that the user corresponding to the target terminal has signed in.

4. A sign-in method, comprising:
   determining whether a target terminal is located in a sign-in area to obtain a first determination result;
   when a sign-in condition is satisfied, changing a status of a user corresponding to the target terminal to a signed-in status,
   wherein the sign-in condition comprises at least: the first determination result indicates that the target terminal is located in the sign-in area,
   wherein the determining whether a target terminal is located in a sign-in area to obtain a first determination result comprises:
   receiving a sign-in message sent from the target terminal;
   conducting a base station positioning for the target terminal sending the sign-in message to determine base station positioning information of the target terminal; and
   determining, according to the base station positioning information, whether the target terminal is in the sign-in area to obtain the first determination result, and
   wherein the method further comprises:
   determining whether a second time point, at which the sign-in message is received from the target terminal, is in a preset time period to obtain a fourth determination result;
   determining whether the status of the user corresponding to the target terminal is an unsigned-in status to obtain a fifth determination result;
   determining whether contents of the sign-in message sent from the target terminal are same as contents of a preset first sign-in message to obtain a sixth determination result; and
   changing the status of the user corresponding to the target terminal to a signed-in status when the sign-in condition is satisfied,
   wherein the sign-in condition further comprises:
   the fourth determination result indicates that the second time point is in the preset time period,
   the fifth determination result indicates that the status of the user corresponding to the target terminal is the unsigned-in status, and
   the sixth determination result indicates that the contents of the sign-in message sent from the target terminal are same as the contents of the preset first sign-in message.

5. A sign-in device, comprising:
   a processor; and
   a memory configured to store instructions executable by the processor;
   wherein the processor is configured to perform:
   determining whether a target terminal is located in a sign-in area to obtain a first determination result;
   when a sign-in condition is satisfied, changing a status of a user corresponding to the target terminal to a signed-in status,
   wherein the sign-in condition comprises at least: the first determination result indicates that the target terminal is located in the sign-in area,
   wherein the processor is further configured to perform:
   monitoring signals of original terminals currently located in the sign-in area;
   extracting terminal identifiers of the original terminals according to the monitored signals; and
   determining an original terminal as the target terminal when a terminal identifier of the original terminal exists in a preset terminal identifier list, and
   wherein the processor is further configured to perform:
   determining whether a first time point, at which a signal of the target terminal is monitored, is in a preset time period to obtain a second determination result;
   determining whether the status of the user corresponding to the target terminal is an unsigned-in status to obtain a third determination result;
   changing the status of the user corresponding to the target terminal to a signed-in status when the sign-in condition is satisfied, wherein the sign-in condition further comprises:
the second determination result indicates that the first time point is in the preset time period, and
the third determination result indicates that the status of the user corresponding to the target terminal is the unsigned-in status.

6. The device according to claim 5, wherein the sign-in area is determined according to a position where the target terminal is currently located and a preset radius of the sign-in area.

7. The device according to claim 5, wherein after changing the status of the user corresponding to the target terminal to a signed-in status when the sign-in condition is satisfied, the processor is further configured to perform:
notifying that the user corresponding to the target terminal has signed in.

8. A sign-in device, comprising:
a processor; and
a memory configured to store instructions executable by the processor;
wherein the processor is configured to perform:
receiving a sign-in message sent from the target terminal;
conducting a base station positioning for the target terminal sending the sign-in message to determine base station positioning information of the target terminal; and
determining, according to the base station positioning information, whether the target terminal is in the sign-in area to obtain the first determination result, and
wherein the processor is further configured to perform:
determining whether a second time point, at which the sign-in message is received from the target terminal, is in a preset time period to obtain a fourth determination result;
determining whether the status of the user corresponding to the target terminal is an unsigned-in status to obtain a fifth determination result;
determining whether contents of the sign-in message sent from the target terminal are same as contents of a preset first sign-in message to obtain a sixth determination result; and
changing the status of the user corresponding to the target terminal to a signed-in status when the sign-in condition is satisfied,
wherein the sign-in condition further comprises:
the fourth determination result indicates that the second time point is in the preset time period,
the fifth determination result indicates that the status of the user corresponding to the target terminal is the unsigned-in status, and
the sixth determination result indicates that the contents of the sign-in message sent from the target terminal are same as the contents of the preset first sign-in message.

* * * * *